Figure 1:
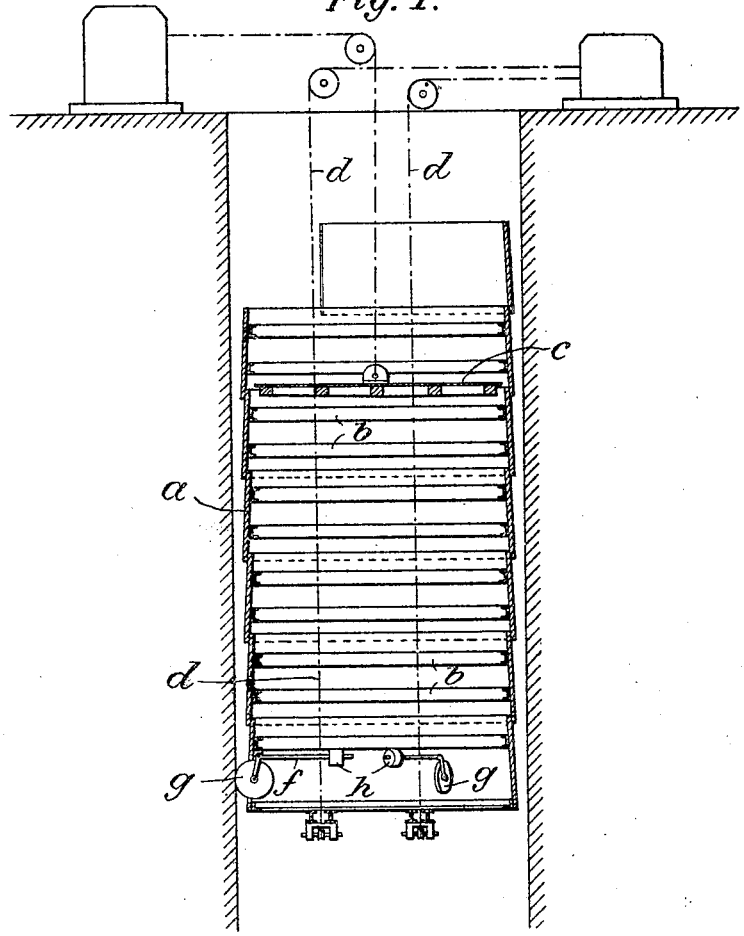

No. 801,432. PATENTED OCT. 10, 1905.
E. ALBRECHT.
SHAFT LINING.
APPLICATION FILED OCT. 12, 1904.

Witnesses:
Arthur Zumpe
Fred Unfricht

Inventor
Emil Albrecht
by Frank v. Briesen Atty.

UNITED STATES PATENT OFFICE.

EMIL ALBRECHT, OF HANOVER, GERMANY.

SHAFT-LINING.

No. 801,432.     Specification of Letters Patent.     Patented Oct. 10, 1905.

Application filed October 12, 1904. Serial No. 228,237.

*To all whom it may concern:*

Be it known that I, EMIL ALBRECHT, a citizen of Germany, residing at Hanover, Germany, have invented new and useful Improvements in Shaft-Linings, of which the following is a specification.

As is well known, the construction of water-tight shaft-linings is generally attended with many difficulties. Hitherto generally cast-iron rings or rims, so-called "tubings," or masonry have been used, or for water-tight lining of shafts under water exceedingly-heavy and thick cast-iron rings were used, which were placed one on the top of another. In using such tubing or cast-iron rings it is necessary to have very accurately machined bearing-surfaces. The separate parts must be carefully connected by screws or bolts and the joints rendered tight with lead packing between the surfaces, which is a very difficult operation; but the use of cast-iron has also the further disadvantage of the lining parts being exceedingly heavy, and therefore difficult to transport, while they are liable to break. With the increasing depth of the shaft the sinking of the lining becomes, therefore, extremely difficult, and it is very necessary to set the lining-cylinder correctly by the use of complicated hydraulic devices. The whole construction becomes, therefore, exceedingly costly on account of the amount of labor and cost of the materials required.

This invention relates to a new construction based on the use of wrought-iron lining parts, these wrought-iron lining parts being built up by riveting from a working platform suspended in the shaft and sunk to a corresponding extent after completion. The lining is preferably stiffened by the use of stiffening iron parts, such as are sometimes employed.

The use of wrought-iron sheets has first of all the great advantage over the old method of construction of reducing the weight of the lining to a minimum. Separate pieces of sheet-iron occupy comparatively little space. They can be easily transported and are much less liable to break than the cast-iron hitherto used. It is also of special importance that the building up of separate light sections can be effected on the spot in a very simple manner and without special machining of the contact-surfaces and without the use of special packing material by riveting from a platform arranged in the shaft. Any leaky places can be hammered out at any moment, so that absolutely - tight joints are insured. The strengthening-rings can finally be screwed on or applied.

A construction according to this invention is illustrated, by way of example, in the accompanying drawings, in which—

Figure 2:
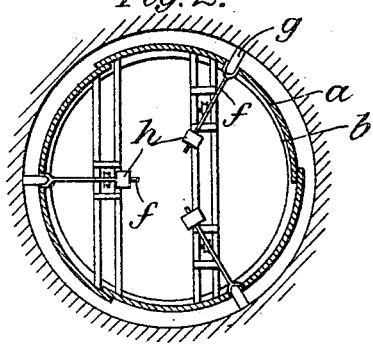

Figure 1 is a vertical section through a portion of a shaft provided with the lining according to this invention, and Fig. 2 is a plan view.

$a$ represents the wrought - iron lining-plates. Each ring consists, preferably, of three arched sections, Fig. 2. The building up is effected in the same way as, say, in steam-boilers, by riveting, this being done in the shaft itself from an adjustable working platform $c$. After one ring has been completed and the stiffening-rings $b$ attached to the inside the lining is sunk to a corresponding extent by means of suspension cables or chains $d$ in order to enable a new ring to be put on above the one last applied.

The lining is preferably suspended from three cables $d$, connected to suitable winding or hoisting engines. These winding devices must work in unison.

In order to prevent the lining from occupying an oblique position, weighted levers $f$ at the bottom are provided with guide-rollers $g$, which act against the side of the shaft.

The weights $h$ press the rollers against the walls of the shaft with equal strength, so that the lining always remains straight or perpendicular. The working platform $c$ is also movable.

The space remaining between the outside of the lining and the surface of the shaft is filled with concrete or the like. The filling may be effected by means of a hollow body in the shape of a ring-segment, which on arriving at the bottom is automatically emptied.

The improved construction is especially adapted for sinking water-tight shafts under water.

What I claim is—

A shaft-lining composed of a series of superposed rings, weighted levers fulcrumed to the bottom ring, rollers carried by the levers that bear against the shaft, and a packing between the shaft and the rings, substantially as specified.

Signed by me at Hanover, Germany, this 28th day of September, 1904.

EMIL ALBRECHT.

Witnesses:
 ROBERT GRIMSHAW,
 LEONORE RASCH.